US010613199B2

(12) United States Patent
Akimoto

(10) Patent No.: US 10,613,199 B2
(45) Date of Patent: Apr. 7, 2020

(54) DISTANCE MEASURING APPARATUS

(71) Applicant: DENSO CORPORATION, Kariya, Aichi-pref. (JP)

(72) Inventor: Rentaro Akimoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/451,570

(22) Filed: Jun. 25, 2019

(65) Prior Publication Data

US 2019/0391239 A1 Dec. 26, 2019

(30) Foreign Application Priority Data

Jun. 26, 2018 (JP) .................................. 2018-120768

(51) Int. Cl.
 *G01S 17/42* (2006.01)
 *G01S 7/481* (2006.01)
 *G01S 7/484* (2006.01)
(52) U.S. Cl.
 CPC ............ *G01S 7/4813* (2013.01); *G01S 7/484* (2013.01); *G01S 17/42* (2013.01)
(58) Field of Classification Search
 CPC ...... G01S 17/89; G01S 7/4817; G01S 17/936; G01S 17/42; G01S 17/023; G01S 17/10; G01S 7/4813; G01S 17/08; G01S 7/4808; G01S 17/87; G01S 7/4815; G01S 17/026; G01S 17/58; G01S 17/93; G01S 7/4863; G01S 7/497; G01S 7/484; G01S 7/4814; G01S 7/4816; G01S 17/48; G01S 7/486; G01S 7/4861; G01S 7/4865; G01S 7/487; G01S 7/4972; G01S 13/931; G01S 15/08; G01S 17/46; G01S 19/13; G01S 3/782; G01S 7/4868; G01S 7/4876; G01S 13/08; G01S 13/584; G01S 13/867; G01S 13/878; G01S 15/025; G01S 15/42; G01S 15/58; G01S 15/89; G01S 15/8993; G01S 15/8997; G01S 17/003; G01S 17/06; G01S 17/325;

(Continued)

(56) References Cited

U.S. PATENT DOCUMENTS

2001/0012145 A1\* 8/2001 Pierenkemper ......... G01S 7/481
 359/216.1
2016/0227193 A1\* 8/2016 Osterwood ............. G01S 17/42

(Continued)

FOREIGN PATENT DOCUMENTS

JP 2002-031685 A 1/2002

*Primary Examiner* — Michael P Stafira
(74) *Attorney, Agent, or Firm* — Knobbe, Martens, Olson & Bear, LLP

(57) ABSTRACT

In a distance measuring apparatus, a housing is made of a first material that is non-transmissive of an electromagnetic wave, and includes an inner chamber, and a window portion made of a second material that is transmissive of the electromagnetic wave and reflection wave. The housing includes a partitioning wall made of a third material that is non-transmissive of the electromagnetic wave. The partitioning wall is configured to partition the inner chamber of the housing into a first container chamber and a second container chamber. In the first container chamber, a transceiver is installed. The first container chamber communicates with the window portion. In the second container chamber, the processing unit is installed.

6 Claims, 6 Drawing Sheets

(58) Field of Classification Search
CPC .......... G01S 17/50; G01S 17/66; G01S 17/88;
G01S 17/895; G01S 17/933; G01S 19/48;
G01S 1/24; G01S 2007/4091; G01S
2013/468; G01S 3/781; G01S 7/003;
G01S 7/4021; G01S 7/417; G01S 7/4802;
G01S 7/4818; G01S 7/483; G01S 7/489;
G01S 7/51

See application file for complete search history.

(56) References Cited

U.S. PATENT DOCUMENTS

| | | | |
|---|---|---|---|
| 2017/0120337 A1* | 5/2017 | Kanko | B22F 3/1055 |
| 2017/0241765 A1* | 8/2017 | Adie | G01B 9/02091 |
| 2017/0261273 A1* | 9/2017 | Maranville | F25B 1/00 |
| 2018/0329066 A1* | 11/2018 | Pacala | G01S 17/023 |
| 2019/0179028 A1* | 6/2019 | Pacala | G01S 7/497 |
| 2019/0227175 A1* | 7/2019 | Steinberg | G01S 7/4817 |

* cited by examiner

DISTANCE MEASURING APPARATUS

CROSS REFERENCE TO RELATED APPLICATION

This application is based on and claims the benefit of priority from Japanese Patent Application No. 2018-120768 filed on Jun. 26, 2018, the disclosure of this application is incorporated in its entirety herein by reference.

TECHNICAL FIELD

The present disclosure relates to apparatuses for transmitting electromagnetic waves and receiving reflected electromagnetic waves to thereby measure the distance of a target object.

BACKGROUND

A known distance measuring apparatus measures the distance of a target object relative to the apparatus using electromagnetic waves, such as light or millimeter waves.

SUMMARY

A distance measuring apparatus according to an exemplary aspect of the present disclosure includes a housing made of a first material that is non-transmissive of an electromagnetic wave. The housing includes an inner chamber, and a window portion made of a second material that is transmissive of the electromagnetic wave and reflection wave. The housing includes a partitioning wall made of a third material that is non-transmissive of the electromagnetic wave. The partitioning wall is configured to partition an inner chamber of the housing into a first container chamber in which a transceiver is installed, and a second container chamber. The first container chamber communicates with the window portion, and the second container chamber in which a processing unit is installed.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Inventor's View Point

Figure 1:
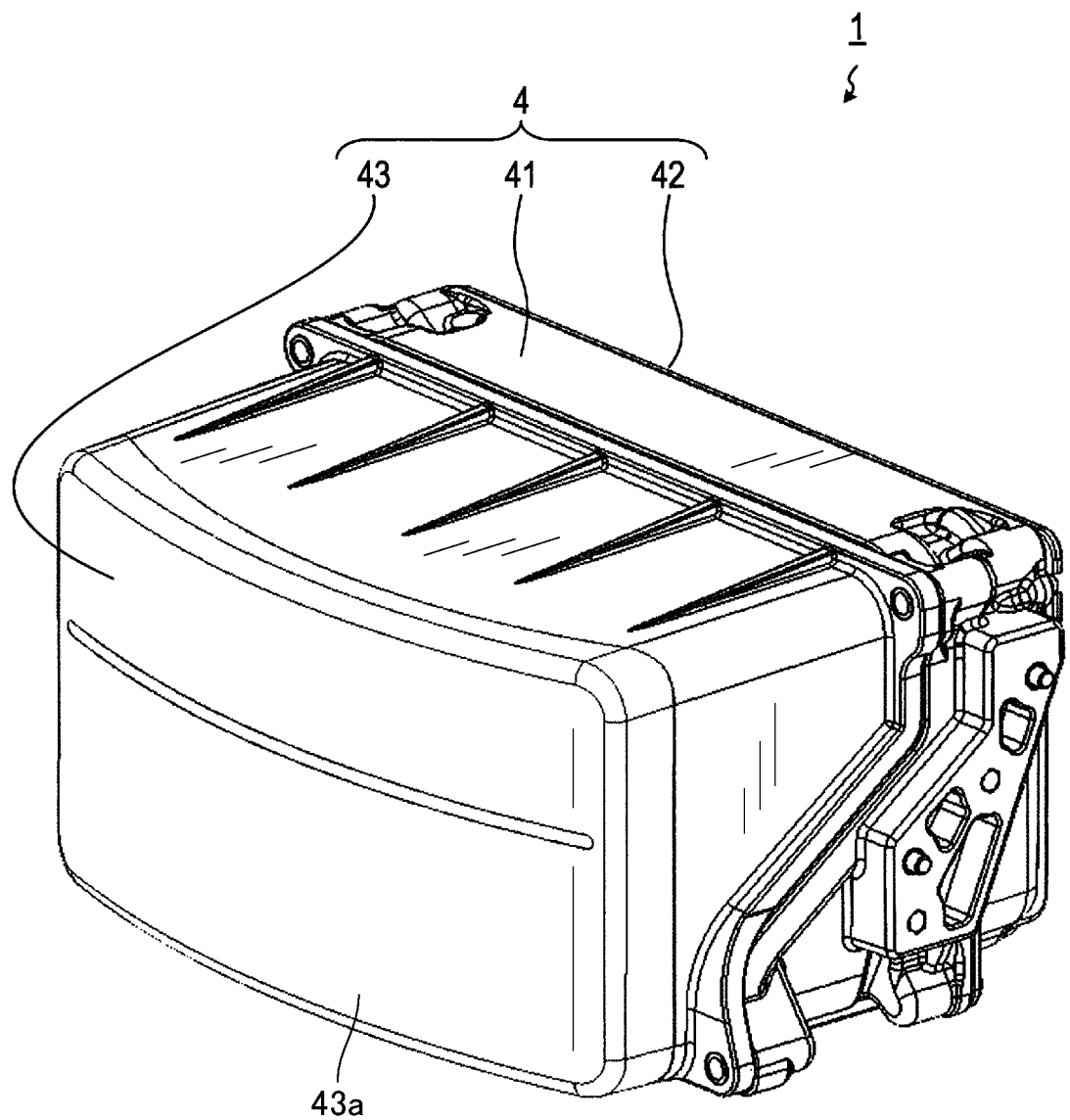
FIG. 1 is a perspective view schematically illustrating an example of the overall configuration of a distance measuring apparatus according to an exemplary embodiment of the present disclosure.

Japanese Patent Application Publication No. 2002-31685 discloses a distance measuring apparatus for measuring the distance of a target object relative to the apparatus using electromagnetic waves, such as light or millimeter waves.

Such a distance measuring apparatus is comprised of a housing, a transceiver, and a circuit board. The transceiver transmits electromagnetic waves, and receives electromagnetic waves generated based on reflection of the transmitted electromagnetic waves from a target object. The circuit board includes a control circuit, such as a processing unit, mounted thereto, and the control circuit is configured to drive the transceiver to thereby transmit electromagnetic waves, and receive reflected electromagnetic waves generated based on reflection of the transmitted electromagnetic waves from a target object. The control circuit is also configured to perform, based on the received reflected electromagnetic waves, a task of measuring the distance of the target object. The transceiver and the circuit board are installed in the housing.

In particular, the housing includes a transmissive window formed at one of walls constituting the housing; the transmissive window is made of, for example, a light-transmissive material, such as resin or glass. That is, the distance measuring apparatus is configured such that the transceiver transmits electromagnetic waves through the transmissive window, and receives reflected electromagnetic waves through the transmissive window.

The inventor of the present disclosure has considered in detail the disclosure of the above published patent document, and accordingly has found that there is an issue described hereinafter in the published patent document.

The transceiver and the circuit board of the distance measuring apparatus disclosed in the published patent document are disposed in the common inner space of the housing. This may result in the control circuit mounted to the circuit board being susceptible to electromagnetic noise entering through the transmissive window into the housing.

The present disclosure includes at least a technical aspect that is capable of reducing adverse effects of electromagnetic noise entering a housing of a distance measuring apparatus.

A distance measuring apparatus according to an exemplary aspect of the present disclosure includes a transceiver configured to transmit an electromagnetic wave, and receive a reflection wave based on reflection of the electromagnetic wave from a target object, and a processing unit including at least one circuit board to which a circuit for measuring a distance of the target object based on at least the received reflection wave is mounted. The distance measuring apparatus includes a housing made of a first material that is non-transmissive of the electromagnetic wave. The housing includes an inner chamber, and a window portion made of a second material that is transmissive of the electromagnetic wave and reflection wave. The housing includes a partitioning wall made of a third material that is non-transmissive of the electromagnetic wave. The partitioning wall is configured to partition the inner chamber of the housing into a first container chamber in which the transceiver is installed, and a second container chamber. The first container chamber communicates with the window portion, and the second container chamber in which the processing unit is installed.

This configuration of the apparatus therefore prevents the processing unit from being influenced by electromagnetic noise entering the housing through the window portion.

Embodiment

The following describes an exemplary embodiment of the present disclosure with reference to the accompanying drawings. In the exemplary embodiment and its modifications, like reference characters are assigned to like or identical parts between the exemplary embodiment and its modifications, so that the descriptions for one of the like or identical parts are applied to another of the like or identical parts.

Schematic Configuration of Distance Measuring Apparatus

Figure 2:
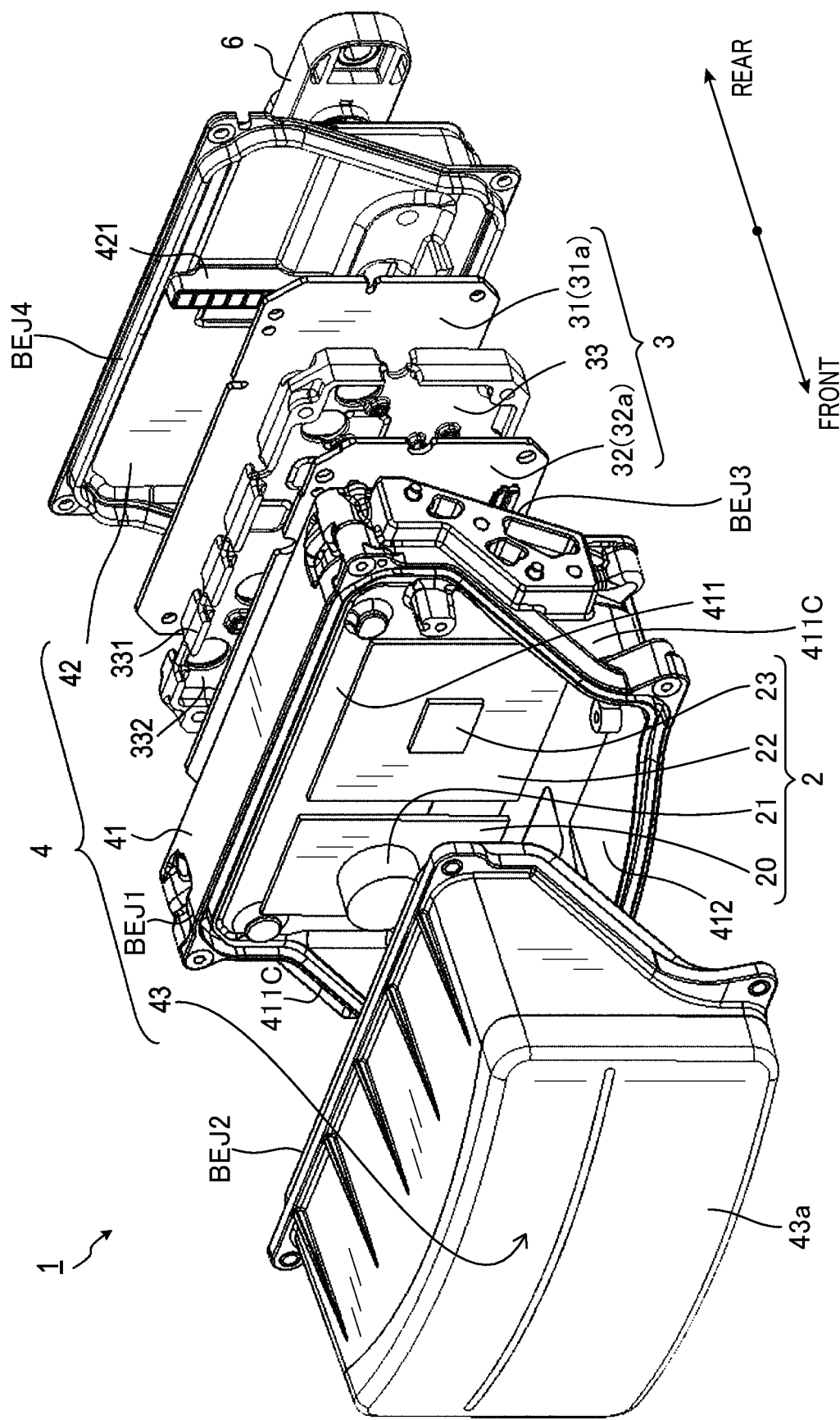
FIG. 2 is an exploded perspective view schematically illustrating the distance measuring apparatus illustrated in FIG. 1.
Figure 3:
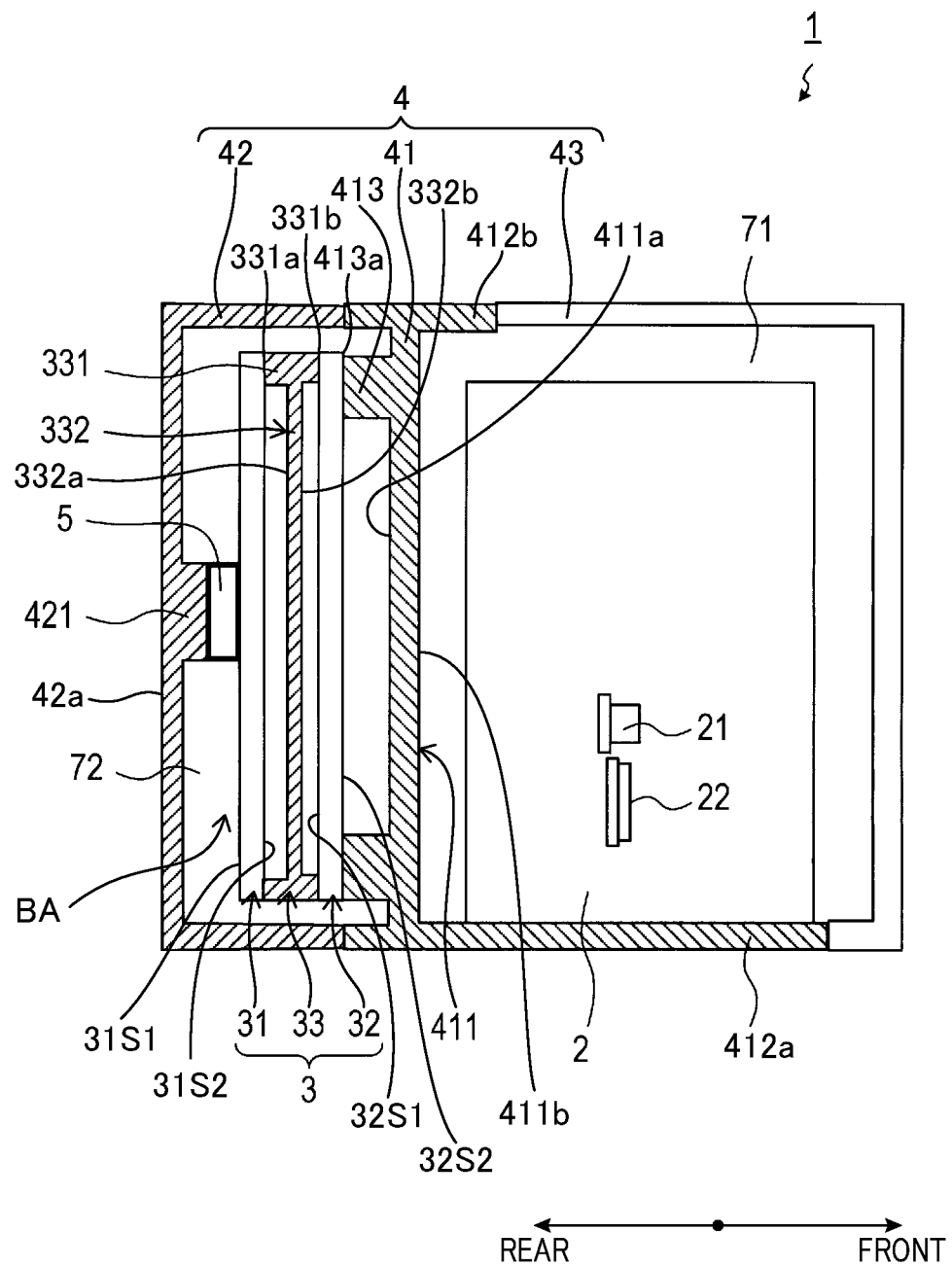
FIG. 3 is a partially cross-sectional view of the distance measuring apparatus illustrated in FIG. 1.

The following describes an example of the configuration of a distance measuring apparatus 1 according to the exemplary embodiment with reference to FIGS. 1 to 3.

Referring to FIGS. 1 to 3, the distance measuring apparatus 1 is installable in a vehicle, and serves as, for example, a Light Detection and Ranging (LIDAR) for transmitting light, and receiving light from each of various objects located around the vehicle, thus detecting the various objects.

For example, the distance measuring apparatus 1, which will be simply referred to as the apparatus 1, includes a transceiver, i.e. a transmitting/receiving unit, 2 a processing unit 3, a housing 4, a heat transfer member 5, and a connector 6. Note that the connector 2 is illustrated only in FIG. 2, and the heat transfer member 5 is illustrated only in FIG. 3. In FIG. 3, illustration of the connector 6 is omitted.

The transceiver 2 includes a light emitting board 20, a light emitting unit 21, a light receiving board 22, a light receiving unit 23, and an unillustrated scanning unit.

The light receiving unit 23 is mounted to the light receiving board 22, and is comprised of light receiving elements; the light receiving elements constitute a light detection region of the light receiving unit 23.

The light emitting unit 21 is mounted to the light emitting board 20, and is configured to emit probing light, i.e. laser light, from a light emitting surface thereof.

The scanning unit is configured to
(1) Change the direction of the probing light emitted from the light emitting unit 21 as a scanning direction to thereby scan the probing light within a changeable measurement region around the vehicle
(2) Focus light arriving from a selected scanning direction on the light detection region of the light receiving unit 23

Then, the light receiving unit 23 is configured to receive, by each light receiving element, a corresponding light component of the focused light on the light detection region thereof, thus generating, for example, a light intensity signal indicative of an intensity of each light component by the corresponding light receiving element.

The processing unit 3 includes a first circuit board 31, a second circuit board 32, and a spacer 33.

The first circuit board 31 is comprised of a first circuit 31a mounted thereto, and the second circuit board 32 is comprised of a second circuit 32a mounted thereto. One of the first and second circuits 31a and 32a for example includes a power supply circuit, a driver, and a measuring circuit.

The power supply circuit is configured to supply electrical power to each of the other components of the first and second circuits 31a and 32a. This enables the other components of the first and second circuits 31a and 32a to operate. The driver is configured to send a first drive signal to the light emitting unit 21 to thereby drive the light emitting unit 21 such that the light emitting unit 21 emits probing light, i.e. laser light.

The driver is also configured to send a second drive signal to the scanning unit to thereby drive the scanning unit such that the scanning unit scans the probing light emitted from the light emitting unit 21 within the changeable measurement region.

The measuring circuit is configured to
(1) Measure time elapsed from the emitting of the probing light to the receiving of the light based on the emitted probing light in accordance with the first drive signal and the light intensity signals received by the respective light receiving elements
(2) Measure the distance of a target object relative to the apparatus 1 based on the measured time The spacer 33 is comprised of, for example, a frame 331 made of, for example, a metallic material, and a partitioning plate 332.

The frame 331 has, for example, a substantially rectangular tubular shape with a predetermined axial length. The frame 331 has opposing first and second peripheral surfaces 331a and 331b. The first circuit board 31 has opposing first and second major surfaces 31S1 and 31S2, and the first circuit board 31 is attached to the frame 331 such that the peripheral edge of the second major surface 31S2 of the first circuit board 31 abuts onto the first peripheral surface 331a of the frame 331. Similarly, the second circuit board 32 has opposing first and second major surfaces 32S1 and 32S2, and the second circuit board 32 is attached to the frame 331 such that the peripheral edge of the first major surface 32S1 of the second circuit board 32 abuts onto the second peripheral surface 331b of the frame 331.

The first major surface 31S1 of the first circuit board 31 serves as a component mount surface on which the light emitting board 20 and the light receiving board 22 are mounted.

The first and second circuit boards 31 and 32 attached to the respective first and second peripheral surfaces 331a and 331b of the frame 331 provide a clearance among the first and second circuit boards 31 and 32 and the frame 331.

The partitioning plate 332 has a substantially rectangular shape with opposing first and second major surfaces 332a and 332b. The partitioning plate 332 is coaxially filled in the frame 331 to be fixed to the frame 331 such that
(1) The first major surface 332a faces the second major surface 31S2 of the first circuit board 31 with a first clearance between the first major surface 332a and the second major surface 31S2
(2) The second major surface 332b faces the first major surface 32S 1 of the second circuit board 32 with a second clearance between the second major surface 332b and the first major surface 32S1

The peripheral edge of the first circuit board 31 has plural through holes formed therethrough, and the peripheral edge of the second circuit board 32 has plural through holes formed therethrough to be in alignment with the respective through holes of the first circuit board 31. The frame 331 has through holes formed therethrough to be in alignment with the respective through holes of the first circuit board 31 and the respective through holes of the second circuit board 32.

For example, penetrating bolts into the respective aligned through holes of the first circuit board 31, the second circuit board 32, and the frame 331 of the spacer 33 and threadably mounting nuts to the respective bolts makes it possible to fasten the first circuit board 31, the second circuit board 32, and the frame 331 of the spacer 33 to each other. This results in a board assembly BA comprised of the first circuit board 31, the second circuit board 32, and the spacer 33 being assembled to each other.

The housing 4 is a container having a substantially rectangular parallelepiped appearance configuration, so that the housing 4 has a substantially rectangular parallelepiped inner chamber defined therein. The housing 4 is comprised of a substantially plate-like partitioning wall 411 that partitions the rectangular parallelepiped inner chamber into a first container chamber 71 for containing therein the transceiver 2, and a second container chamber 72 for containing therein the processing unit 3. For example, the partitioning wall 411 can partition the rectangular parallelepiped inner chamber into the first container chamber and the second container chamber while electromagnetically isolating the first and second container chambers 71 and 72 from each other.

Specifically, the housing 4 is comprised of a first housing segment 41, a second housing segment 42, and a third housing segment 43; each of the first and second housing segments 41 and 42 is made of, for example, a metallic material. The third housing segment 43 is made of, for example, a probing-light transmissive material, i.e. a laser-light transmissible material, i.e. a material that is transmissive of probing light, i.e. laser light, i.e. electromagnetic waves. That is, the third housing segment 43 serves as a light-transmissive window segment.

The first housing segment 41 is comprised of the partitioning wall 411 that has opposing upper and lower ends when the apparatus 1 is installed in a vehicle in its height direction. Note that, when the apparatus 1 is installed in a vehicle, the partitioning wall 411 has a first major surface 411a directed toward, for example, the rear side of the vehicle, and a second major surface 411b, which is opposite to the first major surface 411a, directed toward, for example, the front side of the vehicle. Hereinafter, the upper, lower, front, and rear directions of the vehicle respectively correspond to the upper, lower, front, and rear directions of the apparatus 1.

The lower end of the partitioning wall 411 extends toward the front direction of the apparatus 1 in perpendicular to the first surface 411a to thereby serve as a bottom wall 412a that defines part of the first container chamber 71. That is, the transceiver 2 is mounted on, for example, an upper major surface of the bottom wall 412a. The upper end of the partitioning wall 411 extends toward the front direction of the apparatus 1 in perpendicular to the first surface 411a to thereby serve as a top wall 412b that defines part of the first container chamber 71. The extending length of the bottom wall 412a is longer than the extending length of the top wall 412b.

The partitioning wall 411 is also comprised of a substantially rectangular tubular frame-like board support 413, which will be referred to simply as a board support 413, mounted onto the first major surface 411a of the partitioning wall 411 so as to project toward the rear direction of the apparatus 1. That is, the board support 413 has a substantially rectangular frame-like support surface 413a on which the second major surface 32S2 of the second circuit board 32 is mounted, so that the board assembly BA, i.e. the processing unit 3, is mounted onto the partitioning wall 411 via the board support 413.

Each of the bottom and top walls 412a and 412b also extends toward the rear end of the apparatus 1 such that the rear end surface of each of the bottom and top walls 412a and 412b is for example aligned with the support surface 413a of the board support 413.

The partitioning wall 411 is further comprised of sidewalls 411c joining the bottom wall 412a and the top wall 412b thereof. The front-side extending end of the bottom wall 412a, the front-side extending end of the top wall 412b, and a front-side end of each of the sidewalls 411c are joined to each other to constitute a predetermined shaped first butt-joint edge BJE1.

The third housing segment 43, i.e. the light-transmissive window segment, has a substantially box shape with a rectangular base wall 43a and a predetermined shaped second butt-joint edge BJE2 that constitutes an opening end opposite to the base wall 43a The second butt-joint edge BJE2 is formed in conformity with the first butt-joint edge BJE1. Joining the first butt-joint edge BJE1 of the partitioning wall 411 to the second butt-joint edge BJE2 of the third housing segment 43 enables (1) The first container chamber 71 having a substantially rectangular parallelepiped shape to be defined between the third housing segment 43 and the partitioning wall 411

(2) The base wall 43a of the third housing segment 43 to serve as a front light-transmissive window of the apparatus 1

For example, the light emitting board 20 and the light receiving board 22 are disposed on the first major surface 31S1 of the first circuit board 31 such that (1) The light emitting board 20 and the light receiving board 22 are aligned in a width direction of the vehicle (2) The light emitting surface of the light emitting unit 21 is directed toward, for example, the front of the vehicle through the front light-transmissive window 43a of the apparatus 1

(3) The light receiving surface of the light receiving unit 23 is directed toward, for example, the front of the vehicle through the front light-transmissive window 43a of the apparatus 1

The rear-side extending end of the bottom wall 412a, the rear-side extending end of the top wall 412b, and a rear-side end of each of the sidewalls 411c are joined to each other to constitute a predetermined shaped third butt-joint edge BJE3.

The second housing segment 42 has a substantially box shape with a rectangular base wall 42a and a predetermined shaped fourth butt-joint edge BJE4 that constitutes an opening end opposite to the base wall 42a. The fourth butt-joint edge BJE4 is formed in conformity with the third butt-joint edge BJE3. Joining the third butt-joint edge BJE3 of the partitioning wall 411 to the fourth butt-joint edge BJE4 of the second housing segment 42 enables the second container chamber 72 having a substantially rectangular parallelepiped shape to be defined between the second housing segment 42 and the partitioning wall 411.

The base wall 42 of the second housing segment 42 has an inner surface that faces the first major surface 31S1 of the first circuit board 31 of the board assembly BA, i.e. the processing unit 3, fixedly mounted to the board support 413. The second housing segment 42 is comprised of a projection member 421 projecting from the inner surface of the base wall 42 toward the first major surface 31S 1 of the first circuit board 31. This results in a smaller clearance between the inner surface of the base wall 42 and the first major surface 31S1, i.e. the component mount surface, of the first circuit board 31. For example, the projection member 421 can be located to a predetermined position of the inner surface of the base wall 42 such that the projection member 421 faces a higher heating portion of the first circuit board 31 (see FIG. 3). Note that the higher heating portion of the first circuit board 31 represents a portion of the component mount surface 31S1 on which higher temperature components are mounted.

In FIG. 2, the projection member 421 can project the inner surface of the base wall 42 toward the first major surface 31S1 of the first circuit board 31 while having a constant projecting height from an upper end of the base wall 42 to a lower end of the base wall 42.

The apparatus 1 includes the heat transfer member 5 made of, for example, a gel-like material or a sheet-like material, which has a higher thermal conductivity than air. The heat transfer member 5 is disposed between the projection member 421 and the higher heating portion of the first circuit board 31 to bridge a clearance between the projection member 421 and the higher heating portion of the first circuit board 31. For example, coating a gel-like material or a sheet-like material on at least one of the projection member 421 and the higher heating portion of the first circuit board 31 enables the heat transfer member 5 to be disposed between the projection member 421 and the higher heating portion of the first circuit board 31. That is, the higher heating portion of the first circuit board 31 is in physical contact with the second housing segment 42 via the heat transfer member 5.

Note that the bottom wall 412a of the partitioning wall 411 has one or more wiring holes formed therethrough, whose illustration is omitted. Wires, which connect the transceiver 2 and the processing unit 3, are arranged to pass through the one or more wiring holes.

The apparatus 1 includes a connector 6 mounted to, for example, an outer surface of the second housing segment 42. The connector 6 enables (1) The processing unit 3 to communicate with external devices via signal lines (2) Electrical power to be supplied from an external device to each of the transceiver 2 and the processing unit 3

Next, the following describes how the apparatus 1 configured set forth above works.

The processing unit 3 instructs the light emitting unit 21 of the transceiver 2 to transmit probing light, i.e. laser light, from the light emitting surface thereof toward the front side of the vehicle via the light-transmissive window segment 43. The light receiving unit 23 of the transceiver 2 receives return light generated based on reflection of the transmitted probing light from a target object. The processing unit 3 performs, based on the probing light transmission timing and the return light reception timing, a task of measuring the distance of the target object relative to the apparatus 1. For example, the processing unit 3 measures time of flight (TOF) during which probing light, such as laser light, emitted from the light emitting unit 21 is propagated to a target object and, after being reflected by the target object, back to the light receiving unit 23, thus measuring, based on the measured TOF, the distance of the target object relative to the apparatus 1, i.e. the light receiving unit 23.

The following describes technical effects obtained by the apparatus 1.

The apparatus 1 is configured such that the partitioning wall 411 partitions the rectangular parallelepiped inner chamber defined in the housing 4 into the first container chamber 71 for containing therein the transceiver 2 and the second container chamber 72 for containing therein the processing unit 3. That is, the light-transmissive window segment 43 and the partitioning wall 411 define the first container chamber 71 in which the transceiver 2 is installed, and the second housing segment 42, which is non-transmissive, i.e. not transmissive, of light, and the partitioning wall 411 define the second container chamber 72 in which the processing unit 3 is installed.

This configuration of the apparatus 1 therefore prevents the processing unit 3 from being influenced from electromagnetic noise entering the housing 4 through the light-transmissive window segment 43.

The apparatus 1 is also configured such that the partitioning wall 411 electromagnetically shields the transceiver 2 and the processing unit 3 from each other. This configuration therefore prevents electromagnetic noise generated from the transceiver 2 from negatively affecting the operations of the processing unit 3, and also prevents electromagnetic noise generated by the processing unit 3 from negatively affecting the operations of the transceiver 2.

The apparatus 1 is further configured such that the second container chamber 72, in which the processing unit 3 is disposed, is covered with the first metallic housing segment 41 and the second metallic housing segment 42. In other words, the first and second metallic housing segments 41 and 42 define the second container chamber 72 therebetween.

This configuration therefore enables the apparatus 1 to have higher heat-dissipation performance for the processing unit 3 as compared with a known configuration where a processing unit is disposed in a chamber communicable with a light-transmissive window.

Additionally, the apparatus 1 is configured such that the spacer 33

(1) Integrally holds the first and second circuit boards 31 and 32 while maintaining a clearance between the first and second circuit boards 31 and 32

(2) Includes the partitioning plate 332 disposed in the clearance between the first and second circuit boards 31 and 32

This configuration therefore enables heat filled in the clearance between the first and second circuit boards 31 and 32 to be efficiently dissipated from the clearance via the partitioning wall 332. This configuration also prevents electromagnetic noise generated from one of the first and second circuit boards 31 and 32 from affecting the other thereof.

The apparatus 1 is configured such that the higher heating portion of the first circuit board 31 is in physical contact with the metallic second housing segment 42 via the thermal transfer member 5. This results in further improvement of the heat-dissipation performance of the apparatus 1 for the first circuit board 31.

The present disclosure is not limited to the above exemplary embodiment set forth above, and can be variously modified for example as follows.

The processing unit 3 of the exemplary embodiment is comprised of the first and second circuit boards 31 and 32, but the present disclosure is not limited thereto.

Figure 4:
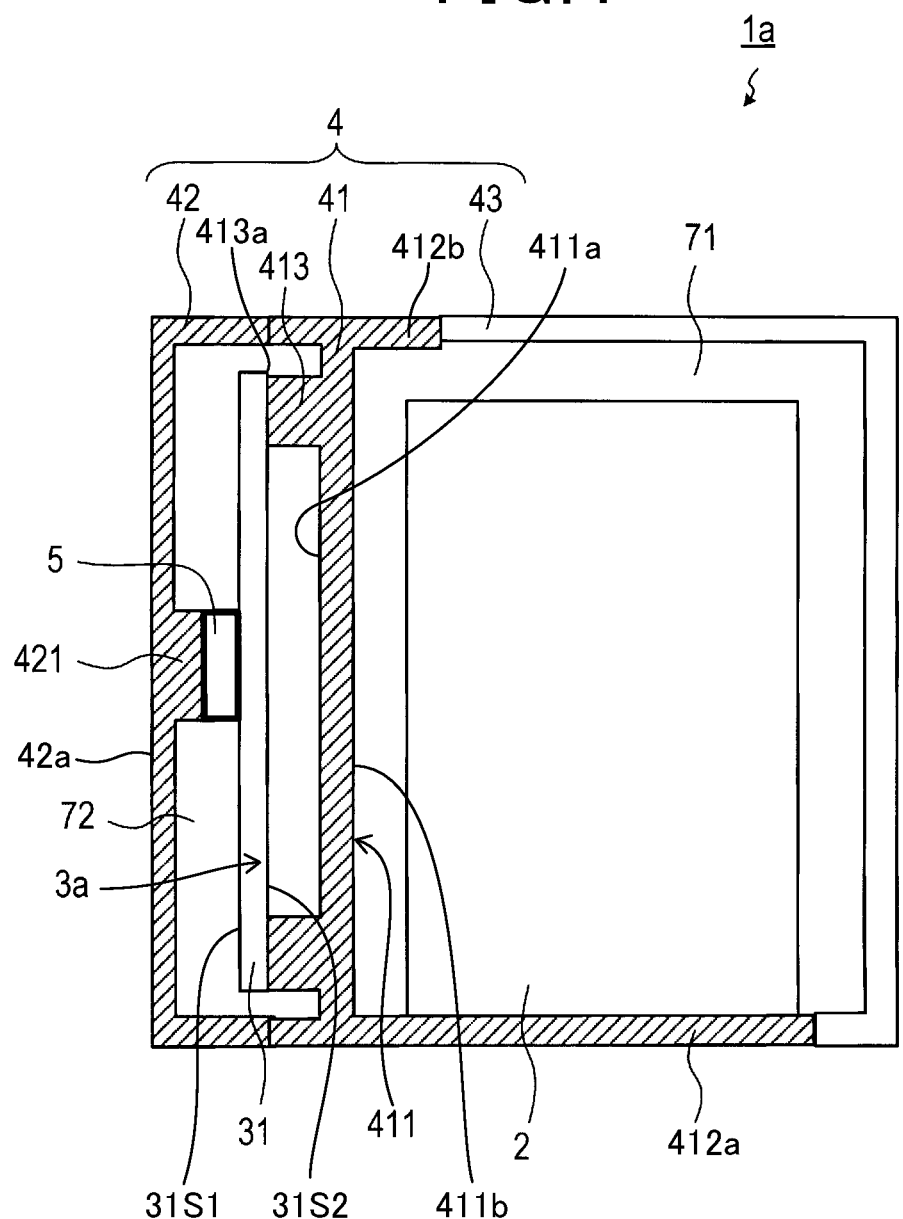
FIG. 4 is a partially cross-sectional view of a distance measuring apparatus according to a first modification of the exemplary embodiment.

Specifically, FIG. 4 schematically illustrates a distance measuring apparatus 1a that includes a processing unit 3a includes the first circuit board 31, which will be referred to simply as a circuit board 31, without including the second circuit board 32 and the spacer 33.

That is, the second major surface 31S2 of the circuit board 31 is mounted on the support surface 413a of the board support 413. As an alternative example, the processing unit 3 can be comprised of three or more circuit boards. In this alternative example, each of the spacers 33 can be inserted in a corresponding one of clearances between the respective adjacent circuit boards.

Figure 5:
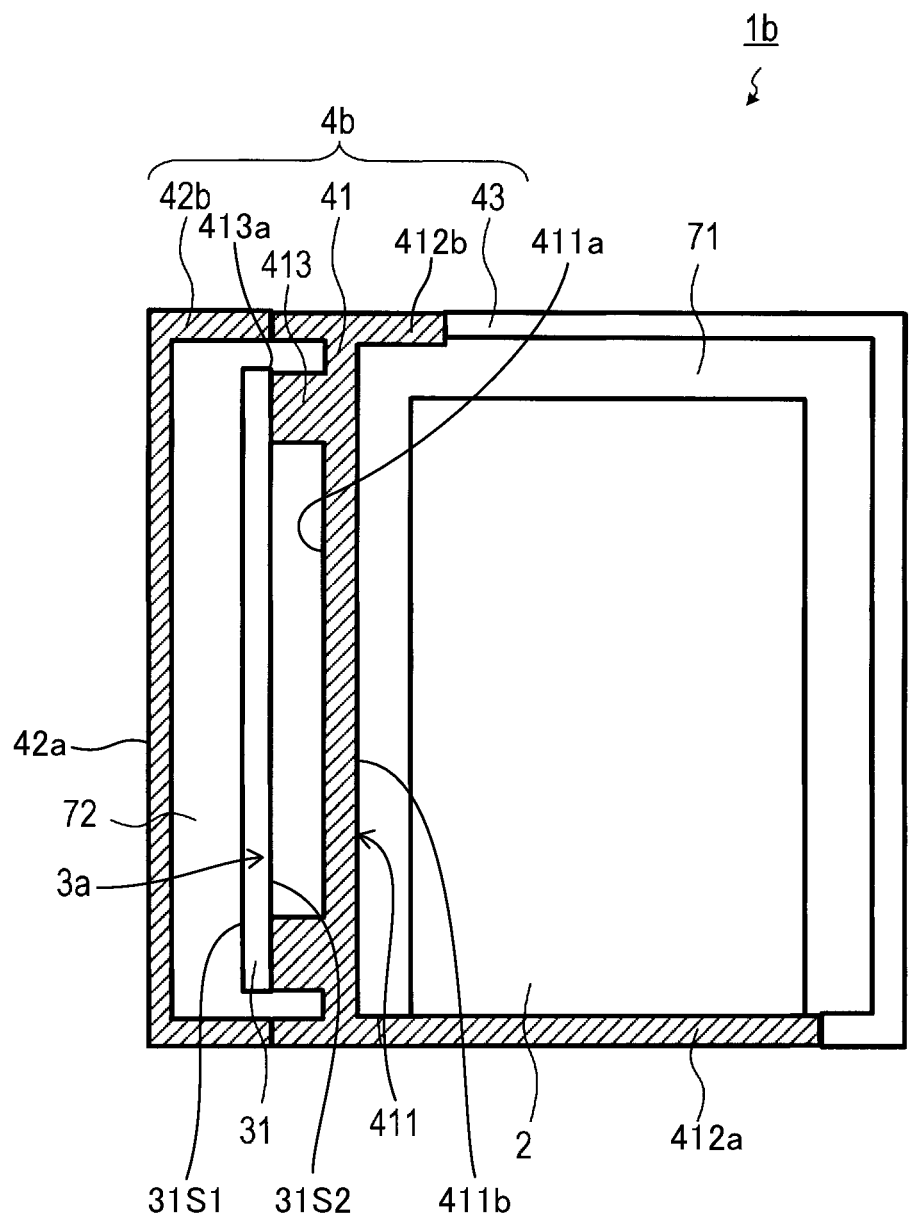
FIG. 5 is a partially cross-sectional view of a distance measuring apparatus according to a second modification of the exemplary embodiment.

As illustrated in FIG. 5, a distance measuring apparatus 1b, which is modified from the configuration of the apparatus 1a, can be configured such that the projection 421 and the heat transfer member 5 can be eliminated as compared with the distance measuring apparatus 1.

Each of the distance measuring apparatuses set forth above can be configured such that the heat transfer member 5 is interposed between the inner surface of the base wall 42a of the second housing segment 42 and the first circuit board 31 without using the projection 421.

Each of the distance measuring apparatuses set forth above can be comprised of plural thermal transfer members interposed between the inner surface of the base wall 42a of the second housing segment 42 and the first circuit board 31. At least one thermal transfer member can be disposed between the second circuit board 32 and the first major surface 411a of the first housing segment 41.

The partitioning wall 411 of each apparatus described above is integrated with the first housing segment 41, but the present disclosure is not limited thereto.

Figure 6:
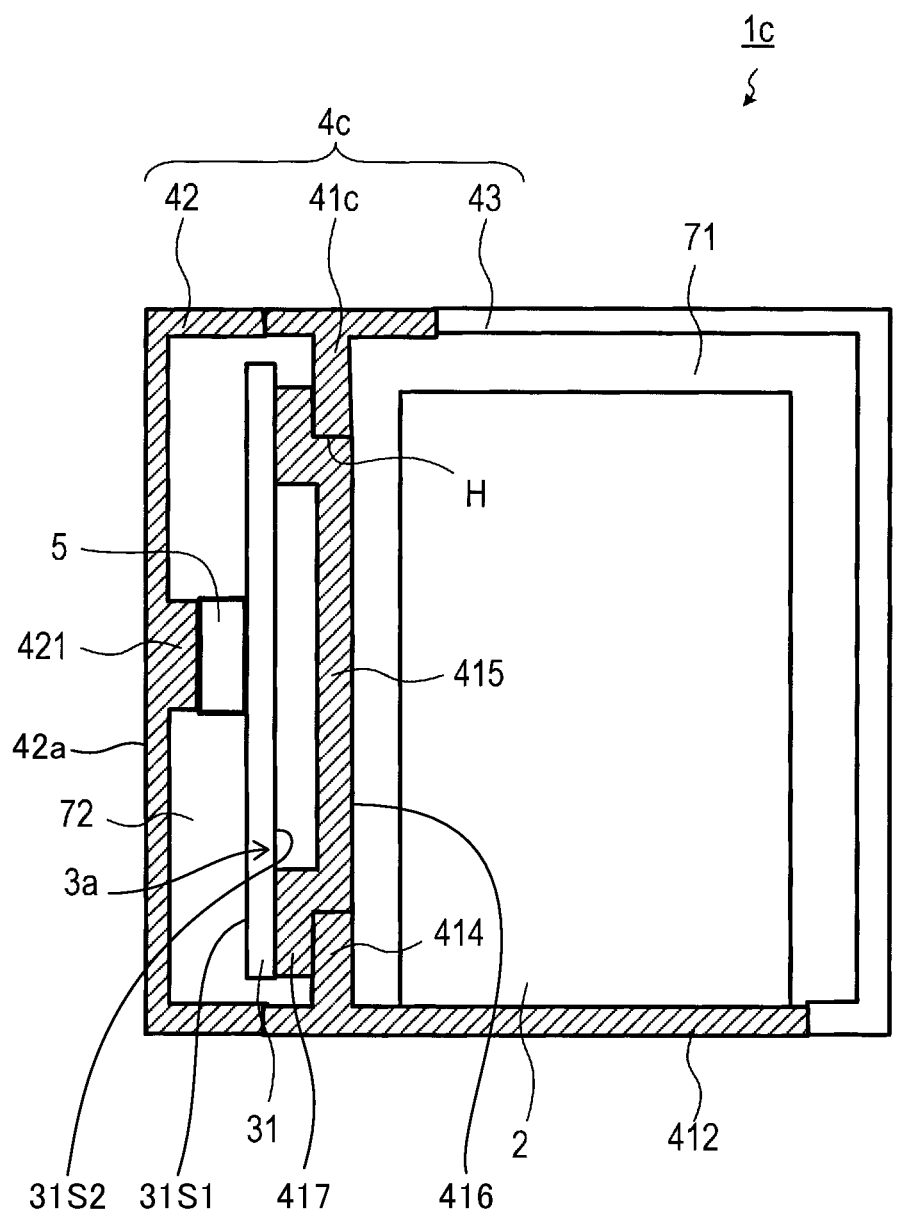
FIG. 6 is a partially cross-sectional view of a distance measuring apparatus according to a third modification of the exemplary embodiment.

Specifically, as illustrated in FIG. 6, a distance measuring apparatus 1c, which is modified from the configuration of the apparatus 1a, can be configured such that a housing 4c is comprised of a first housing segment 41c, the second housing segment 42, and the third housing segment 43.

The first housing segment 41c is comprised of a rectangular plate-like support wall 414 having a rectangular through hole H formed through a center portion thereof. The through hole H enables the first container chamber 71 and the second container chamber 72 to communicate with each other.

The first housing segment 41c is also comprised of a cover partitioning wall 415. The cover partitioning wall 415 includes a cover portion 416 that (1) Has a shape in conformity with the shape of the through hole H (2) Is removably fitted in the through hole H The cover partitioning wall 415 also includes a rectangular flange 417 radially extending from the peripheral edge of the cover 416, and the flange 417 is arranged to be in contact with a peripheral end of the second major surface 31S2 of the circuit board 31 while the cover portion 416 is fitted in the through hole H of the support wall 414.

This configuration of the apparatus 1c enables, during assembling of the apparatus 1c, wiring between the transceiver 2 and the processing unit 3 to be passed through the through hole H of the support wall 414 while the through hole H is uncovered with the cover portion 416 of the cover partitioning wall 415. After the wiring, the cover partitioning wall 415 is fixedly mounted at the cover portion 416 into the through hole H of the support wall 414.

This enables wiring operations between the transceiver 2 and the processing unit 3 to be performed more easily.

The transceiver 2 can be configured to transmit and receive, in place of laser light, one or more electromagnetic waves, such as millimeter waves.

While the illustrative embodiment of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

For example, each of the technical features described in the embodiment and its modifications can be replaced with a known structure having the same function as the corresponding technical feature. Each of the technical features described in the embodiment and its modifications can also be combined with at least one of the other technical features.

At least one of the technical features described in the embodiment and its modifications can further be eliminated unless the at least one of the technical features is described as an essential element in the present specification.

The functions of the distance measuring apparatus can be implemented by various embodiments; the various embodiments include distance measuring systems, programs for serving a computer as the functions, storage media, such as non-transitory media, storing the programs, and distance measuring methods.

What is claimed is:

1. A distance measuring apparatus comprising:
   a transceiver configured to transmit an electromagnetic wave, and receive a reflection wave based on reflection of the electromagnetic wave from a target object;
   a processing unit including at least one circuit board to which a circuit for measuring a distance of the target object based on at least the received reflection wave is mounted; and
   a housing made of a first material that is non-transmissive of the electromagnetic wave,
   the housing comprising:
      an inner chamber;
      a window portion made of a second material that is transmissive of the electromagnetic wave and reflection wave; and
      a partitioning wall made of a third material that is non-transmissive of the electromagnetic wave,
      the partitioning wall being configured to partition the inner chamber of the housing into:
         a first container chamber in which the transceiver is installed, the first container chamber communicating with the window portion; and
         a second container chamber in which the processing unit is installed.

2. The distance measuring apparatus according to claim 1, wherein:
   the housing comprises:
      a first segment including the partitioning wall;
      a second segment joined to the first segment, the first and second segments defining the second container chamber; and
      a third segment including the window portion,
   the third segment and the first segment defining the first container chamber.

3. The distance measuring apparatus according to claim 1, wherein:
   the processing unit comprises:
      at least first and second circuit boards as the circuit board; and
      a spacer that integrally holds the first and second circuit boards such that the first and second circuit boards face each other with a clearance therebetween,
   the spacer comprising a partitioning wall made of a fourth material that is non-transmissive of the electromagnetic wave, the partitioning wall being located in the clearance between the first and second circuit boards.

4. The distance measuring apparatus according to claim 1, further comprising:
   a thermal transfer member disposed to be in contact with both the circuit board and a predetermined portion of the housing, the thermal transfer member having a thermal conductivity higher than a thermal conductivity of air.

5. The distance measuring apparatus according to claim 4, wherein:

the predetermined portion of the housing projects from the housing toward the circuit board such that a clearance between the predetermined portion of the housing and the circuit board is reduced.

6. The distance measuring apparatus according to claim 1, wherein:

the housing comprises a support wall having a through hole formed therethrough, the through hole enabling the first and second container chambers to communicate with each other; and the partitioning wall is configured to be removably fitted in the through hole.

\* \* \* \* \*